US012134544B2

(12) United States Patent
Grumberg

(10) Patent No.: US 12,134,544 B2
(45) Date of Patent: Nov. 5, 2024

(54) ROTATING SUSPENSION POINT FOR USE WITH CONCRETE ANCHORS

(71) Applicant: Brandsafway Services, LLC, Kennesaw, GA (US)

(72) Inventor: Mathieu Grumberg, Delmar, NY (US)

(73) Assignee: BrandSafway Services, LLC, Atlanta, GA (US)

( * ) Notice: Subject to any disclaimer, the term of this patent is extended or adjusted under 35 U.S.C. 154(b) by 0 days.

(21) Appl. No.: 17/632,367

(22) PCT Filed: Jul. 31, 2020

(86) PCT No.: PCT/US2020/044564

§ 371 (c)(1),
(2) Date: Feb. 2, 2022

(87) PCT Pub. No.: WO2021/026014

PCT Pub. Date: Feb. 11, 2021

(65) Prior Publication Data

US 2022/0281720 A1 Sep. 8, 2022

Related U.S. Application Data

(60) Provisional application No. 62/882,378, filed on Aug. 2, 2019.

(51) Int. Cl.
*B66C 1/66* (2006.01)

(52) U.S. Cl.
CPC .................................... *B66C 1/66* (2013.01)

(58) Field of Classification Search
CPC .............. B66C 1/66; B66C 1/34; B66C 13/04
USPC ................................................ 294/82.1, 215
See application file for complete search history.

(56) References Cited

U.S. PATENT DOCUMENTS

| | | | |
|---|---|---|---|
| 1,434,631 | A | 11/1922 | Reynolds |
| 1,708,091 | A | 4/1929 | Healy |
| 1,761,800 | A | 6/1930 | Preis |
| 2,521,001 | A | 9/1950 | Forker, Jr. |

(Continued)

FOREIGN PATENT DOCUMENTS

| | | | |
|---|---|---|---|
| CA | 664178 | A | 6/1963 |
| EP | 0 967 347 | A1 | 12/1999 |

(Continued)

OTHER PUBLICATIONS

International Search Report and Written Opinion issued for International Application No. PCT/US20/44564 dated Oct. 13, 2020, 13 pages.

(Continued)

*Primary Examiner* — Paul T Chin
(74) *Attorney, Agent, or Firm* — Foley & Lardner LLP

(57) ABSTRACT

A rotating suspension point assembly permits rotation and other movement of the assembly relative to the axis of an anchor to which it is attached. Such a rotating suspension point assembly comprises a base, a flanged bushing and a mating convex washer. The base has a plate and a tubular structure projecting from the plate. The flanged bushing has an internal clearance to allow misalignment of an anchor and has a flange with a concave surface. The mating convex washer is aligned with the concave surface of the flanged bushing.

14 Claims, 1 Drawing Sheet

(56) References Cited

U.S. PATENT DOCUMENTS

| | | | | | |
|---|---|---|---|---|---|
| 5,274,887 | A * | 1/1994 | Fudaki | A44B 11/28 24/600.9 |
| 6,068,310 | A * | 5/2000 | Fuller | B66C 1/66 294/215 |
| 6,123,482 | A * | 9/2000 | Keller | F16B 7/0493 403/384 |
| 6,317,940 | B1 * | 11/2001 | Matoba | F16B 45/02 24/601.2 |
| 6,491,329 | B1 * | 12/2002 | Smith | B66C 1/34 294/215 |
| 7,014,230 | B1 * | 3/2006 | Hung | B66C 1/66 294/215 |
| 10,060,466 | B2 * | 8/2018 | Kaneko | F16B 45/02 |
| 2004/0032134 | A1 | 2/2004 | Hageman | |
| 2006/0179784 | A1 * | 8/2006 | Chen | F16B 45/00 52/698 |
| 2009/0159773 | A1 | 6/2009 | Nordbrock | |
| 2012/0061982 | A1 | 3/2012 | Davidson et al. | |
| 2012/0099922 | A1 | 4/2012 | Horikawa et al. | |

FOREIGN PATENT DOCUMENTS

| | | | |
|---|---|---|---|
| JP | 2010-266015 | A | 11/2010 |
| JP | 2015-183375 | A | 10/2015 |

OTHER PUBLICATIONS

Extended European Search Report on EP 20850751.7 dated Jul. 26, 2023 (8 pages).

Spherical levelling washers. Jul. 13, 2017 Product Images Citation is not enclosed due to copyright restrictions. A copy may be obtained from the Wayback Machine at http://web.archive.org/web/20170713021454/https://www.kipp.com/GB/en/Products/Operating-parts-standard-elements/Support-elements-positioning-elements-stop-elements/K0691-Ball-head-precision-adjusters.html (3 pages).

* cited by examiner

ROTATING SUSPENSION POINT FOR USE WITH CONCRETE ANCHORS

CROSS-REFERENCE TO RELATED APPLICATION

This application claims priority to U.S. Provisional Application No. 62/882,378, filed on 2 Aug. 2019, which is incorporated by reference herein in its entirety.

STATEMENT REGARDING FEDERALLY SPONSORED RESEARCH OR DEVELOPMENT

None.

FIELD OF THE INVENTION

The invention relates, generally, to the field of rigging, hoisting and suspension components typically used for construction and maintenance. In one aspect, the invention relates to suspension assemblies which provide rotation and pivoting relative to the concrete or steel structure to which it is secured.

BACKGROUND OF THE INVENTION

Rigging, hoisting and suspension assemblies are used to move equipment and to suspend equipment from structures and surfaces. These structures and surfaces can be horizontal, vertical or overhead. Rigging, hoisting and suspension assemblies are specifically designed to be secured to metal components or structures using a captive threaded fastener or to be secured to concrete components or structures using post-installed or pre-installed anchors. Existing rigging, hoisting and suspension assemblies are not designed with flexibility to facilitate applications to both metal and concrete structures or with the ability to utilize common threaded fasteners or concrete anchors of any length.

Existing rotating rigging, hoisting and suspension assemblies include a fixed bushing which is secured to components or structures and a swiveling or pivoting base that accepts other rigging and hoisting components. Such as a device is commonly referred to as a “swivel hoist ring” or “rotating lifting point”. Because the bushing base of such suspension assemblies is secured directly to the concrete or steel structure using a captive threaded fastener or concrete anchor, the base is generally flush and perpendicular the structure to which it is secured. If the concrete or steel structure is not flat, or if the hole to accept the threaded fastener or concrete anchor is not drilled perpendicular to the surface, subsequent tightening of the threaded fastener or concrete anchor will result in bending of the threaded fastener or concrete anchor, rendering the assembly not fit for service.

A need exists to overcome the above stated, and other, deficiencies of existing suspension point assemblies.

SUMMARY OF THE INVENTION

To overcome the aforementioned, and other, deficiencies, the present invention provides a suspension point assembly for use with concrete anchors.

In an embodiment, a rotating suspension point assembly is provided.

In an embodiment, a rotating suspension point assembly comprises a base having a plate and a tubular structure projecting from the plate; a flanged bushing having a flange with a concave surface; and a convex washer aligned with the concave surface.

In an embodiment, the rotating suspension point assembly further includes a connector as provided herein.

In an embodiment, the disclosure provides a rotating suspension point assembly. In accordance with embodiments of the present disclosure, a rotating suspension point assembly comprises a base having a plate and a tubular structure projecting from the plate; a flanged bushing with internal clearing to allow misalignment of an anchor and having a flange with a concave surface; and a mating convex washer aligned with the concave surface.

In embodiments, the anchor is a threaded fastener or post-installed concrete anchor. In further embodiments, the rotating suspension point assembly is void of any captive fastener so as to allow application of any number of anchors. In accordance with further embodiments, the rotating suspension point assembly further comprises a convex washer having a convex surface corresponding to the concave surface of the flanged bushing. In yet further embodiments, the base further comprises at least two securing plates extending from the base, each having an opening designed to secure another structure.

In an embodiment, the disclosure provides a rotating suspension point assembly. In accordance with embodiments of the present disclosure, a rotating suspension point assembly comprises a base having a plate and a tubular structure projecting from the plate; a concave bushing having a main portion and a flange portion having a surface; and a convex washer.

In an embodiment, the tubular structure projects perpendicularly from the plate. In further embodiments, the main portion of the concave bushing has a first outer diameter and the flange portion has a second outer diameter, and the first outer diameter is less than the second outer diameter. In further embodiments, the tubular structure of the base has a first internal diameter and a second internal diameter, with the first internal diameter being less than the second internal diameter, and the first and second internal diameters of the tubular structure correspond with the first and second outer diameters of the concave bushing.

In an embodiment, the surface of the flange portion of the concave bushing is concave. In still further embodiments, the concave surface of the flange portion of the concave bushing and the convex washer are positioned so as to form a spherical washer. In yet another embodiment, the convex washer has an elongated central opening. In another embodiment each of the base and concave bushing have a central opening coaxial with each other and the elongated central opening of the convex washer. In yet another embodiment, the rotating suspension point assembly further comprises a bearing plate having a surface area greater than that of the plate of the base.

The foregoing and other features and advantages of the invention will be apparent from the following more particular description of embodiments of the invention. It is to be understood that both the foregoing general description and the following detailed description are exemplary, but are not restrictive, of the invention.

BRIEF DESCRIPTION OF THE DRAWINGS

The features of the present invention will best be understood from a detailed description of the invention and an embodiment thereof selected for the purposes of illustration and shown in the accompanying drawings in which.

DETAILED DESCRIPTION OF THE PREFERRED EMBODIMENT

Figure 1:
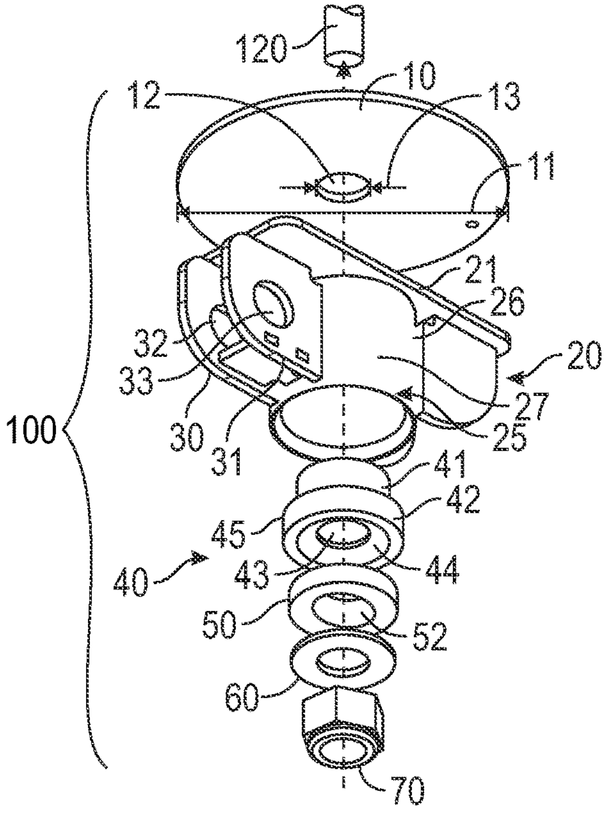
FIG. 1 is an exploded view of a rotating suspension point assembly in accordance with embodiments of the present disclosure.

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms "a", "an" and "the" include plural referents, unless the context clearly dictates otherwise. Further, as used herein, the term "overhead structure" refers to any physical structure from which a work platform may be suspended. Similarly, the term "structure" refers to any physical structure which is accessible using a suspended work platform system. In some embodiments, a structure and an overhead structure may be the same. Exemplary structures and overhead structures include, but are not limited to, bridges, offshore rigs, boilers, boiler pendants, elevated and suspended structures, and ships.

Referring now to the drawings, FIG. 1 is an exploded view of an exemplary rotating suspension point assembly 100 with an anchor 120 protruding from a structure (not shown). The rotating suspension point assembly 100 includes a bearing plate 10, a base 20, a concave bushing 40, a convex washer 50, a flat washer 60 and a nut 70.

The anchor 120 can be any variety of anchor 120 used with concrete and/or metal structures. For example, if the structure is metal, the anchor may be a captive threaded fastener, and if the structure is concrete, the anchor may be a post-installed anchor or pre-installed anchor (e.g., a through bolt). The anchor may be threaded or smooth. As will be appreciated in the following discussion, the anchor may be perpendicular to the structure's surface or not perpendicular to the structure's surface.

A bearing plate 10 is a generally flat, plate-like structure which spreads the force of a load across a greater portion of surface area of the structure experiencing the load. Bearing plates 10 can take many shapes, sizes and geometries. While in the embodiment shown the bearing plate 10 is a generally circular, disc-shaped structure having a plate diameter 11 and a central hole 12 with hole diameter 13, it will be appreciated that the bearing plate 10 may take any shape (e.g., rectangle, square, oval, polygon). Similarly, in the embodiment shown, the plate diameter 11 is shown as just greater than the total length of the base 20, such that no portion of the base 20 extends beyond the dimensions of the bearing plate 10. In other words, the size of the bearing plate 10 is at least partially related to the size and shape of the base 20. In further embodiments, the shape and size of the bearing plate 10 may depend on the particular structure to which the rotating suspension point assembly 100 is attached and the size of the load.

As shown in FIG. 1, the hole 12 is circular, having a hole diameter 13 just greater than the diameter of the portion of the anchor 120 projecting from the structure (not shown). As will be appreciated, the specific shape and size of the hole 12 may vary depending on the type of anchor 120 used, although preferably the anchor 120 has a protruding cylindrical portion and hole 12 and openings in the remaining components are likewise tubular or circular.

The base 20 is made of a plate 21 with a tubular portion 25 extending from the plate 21. A circular hole in the plate (not shown) permits the anchor 120 to pass through the plate 21 and project into the tubular portion 25. The inside of the tubular portion 25 contains portions with different internal diameters, as described in detail below.

The base 20 also includes a pair of plates 30, 31 extending parallel one another from the tubular portion 25. Each plate 30, 31 has an opening 32, 33 there through such that the openings 32, 33 are coaxial. The openings 32, 33 are used various objects or other specific connectors to the base 20.

The concave bushing 40 has a main portion 41 with a first outer diameter and a flange portion 42 with a second outer diameter. The first outer diameter is less than the second outer diameter. The external shape e.g., length of the main portion 41, length of the flange portion 42, and first and second outer diameter, matches the internal contours of the housing (not shown). That is, the tubular portion 25 of the housing does not have a consistent internal diameter along its length. Rather, the first half, or upper half, of the tubular portion 26 has a first internal diameter and the second half, or lower half, of the tubular portion 27 has a second internal diameter, with the first internal diameter being less than the second internal diameter. The transition between the first internal diameter and the second internal diameter is blunt and mates with the flange edge 45 of the concave bushing 40.

A central bore 43 runs the length of the bushing 40 and has an internal diameter sufficient to allow misalignment of the anchor 120 within the rotating suspension point assembly 100. That is, the internal geometry of the central bore 43 is such that the anchor 120 can project into the central bore 43 such that it is not parallel with the central axis of the bore 43.

The lower surface 44 of the bushing 40 has a concave shape, meaning the radiuses along the flange portion 42 are concave, and that concave lower surface 44 matches the convex shape of the convex washer 50, as described further below. Together, the lower surface 44 of the bushing 40 and the convex washer 50 make a spherical washer.

The convex washer 50 is positioned between the concave bushing 40 and the flat washer 60. The convex washer 50 has convex-shaped radiuses around the diameter of the washer 50. The convex radiuses match the concave radiuses of the concave bushing 40. The concave bushing 40 and convex washer 50, together, form a spherical washer to facilitate movement of the assembly 100 relative to the surface to which the assembly 100 is secured.

The convex washer 50 also has an elongated, not circular, central opening 52. The elongated opening 52 allows the convex washer 50 to move relative to the concave bushing 40 and still accommodate the anchor 120.

Together, the combination of the concave bushing 40 and the convex washer 50 provide for sufficient movement such that any structure connected to the anchor 120 does not necessarily need to remain in an axis parallel with the anchor 120.

The flat washer 60 prevents damage to the rotating suspension point assembly 100, specifically to the a concave bushing 40, a convex washer 50 and nut 70, by distributing torque when tightening the nut 70 and also by providing an intermediate structure between the nut 70 and the convex washer 50. While the flat washer 60 is shown as a traditional, circular ring, in further embodiments, the washer 60 may have different geometries, providing the washer has little to variation or contour along the planar surface of the washer, i.e., it is flat.

In the embodiment shown, the nut 70 is an elastic stop nut (ESN); however, in further embodiments, the nut 70 may be any type of nut 70 known in the industry which tightens to the anchor 120 and secures the rotating suspension point assembly 100 to the anchor 120.

Figure 2:
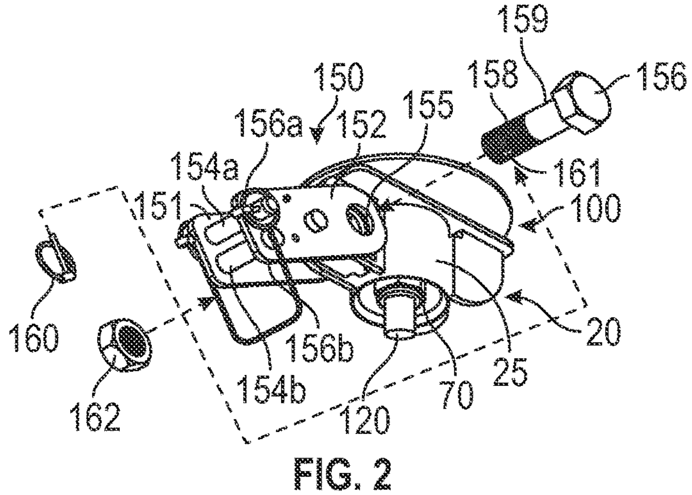
FIG. 2 is an exploded view of the rotating suspension point assembly of FIG. 1 with a connector, in accordance with embodiments of the present disclosure.
Figure 3:
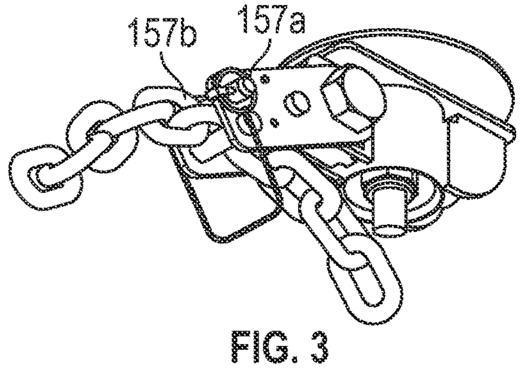
FIG. 3 is the fully assembled rotating suspension point assembly of FIG. 2, in accordance with embodiments of the present disclosure.

As shown in FIG. 2 and FIG. 3, when assembled, the bushing 40, convex washer 50, flat washer 60 and nut 70 are contained within the tubular portion 25 of the base 20, with the anchor 120 projecting out of the assembly 100. In this way, a structure or object may be connected to the anchor 120 without being hindered.

Also shown in FIG. 2 and FIG. 3 is a connector 150 for use with a rotating suspension point assembly 100, in accordance with embodiments of the present disclosure. As shown in FIG. 2, the connector 150 includes two rectangular plates 151, 152, each plate having at least one hole at each of its ends. In the embodiment shown, plate 151 includes a first hole 153 (not shown) and a pair of holes 154*a*, 154*b* at its opposite end. Likewise, plate 152 includes a first hole 155 and a pair of holes 156*a*, 156*b* at its opposite end. It will be appreciated that respective matching holes, e.g., 153 and 155, 154*a* and 156*a*, and 154*b* and 156*b*, are coaxial.

In the embodiment shown, the connector 150 is used to secure a chain to the rotating suspension point assembly 100. The plates 151, 152 are positioned on either side of the plates 30, 31 of the base 20 such that the first holes 153, 155 are coaxial with each other and the openings 32, 33 of the plates 30, 31. A bolt 156 tightens the plates 30, 31, 151 and 152 together and is held in place by a nut 162, with an optional locking pin 160 which engages an opening 161 on the end of the bolt 156. As shown in FIG. 2, the bolt 156 has a threaded portion 158 and a non-threaded portion 159. The bolt 156 is positioned in the openings 153, 32, 33 and 155 such that the threaded portion 158 sticks out from the plates 152, 30, 31 and 153, while the inner surface of the openings 153, 32, 33 and 155 contact the non-threaded portion 159. As a result, the connector 150 can pivot on the axis created by the bolt 156. A pair of pins, such as the lock pins 157*a*, 157*b*, secure the opposite side of the plates 151, 152 together by engaging the pairs of holes 154*a*, 156*a* and 154*b*, 156*b*.

As shown in FIG. 3, a chain may be secured in the connector 150 using the lock pins 157*a*, 157*b*. Because of the pivoting permitted by the bolt 156, the connector 150 may be at an angle from 0° to 90° relative to the angle of the anchor 120.

The materials used in making the components of the rotating suspension point assembly 100 are generally metals.

The foregoing description of the present invention has been presented for purposes of illustration and description. It is not intended to be exhaustive or to limit the invention to the precise form disclosed or to the materials in which the form may be embodied, and many modifications and variations are possible in light of the above teaching.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A rotating suspension point assembly comprising:
- a base having a plate and a tubular structure projecting from the plate;
- a flanged bushing having a main portion with internal clearance to allow misalignment of an anchor and having a flange portion with a flange defining a concave surface, wherein the main portion extends away from the flange portion; and
- a mating convex washer aligned with the concave surface.

2. The rotating suspension point assembly of claim 1, wherein the anchor is a threaded fastener or post-installed concrete anchor.

3. The rotating suspension point assembly of claim 1, wherein the mating convex washer has a convex surface that corresponds with the concave surface of the flanged bushing.

4. The rotating suspension point assembly of claim 1, wherein the base further comprises at least two securing plates extending from the base, each having an opening designed to secure another structure.

5. The rotating suspension point assembly of claim 1, further comprising a bearing plate having a surface area greater than that of the plate of the base.

6. A rotating suspension point assembly comprising:
- a base having a plate and a tubular structure projecting from the plate;
- a concave bushing having a main portion and a flange portion having a surface, wherein the main portion extends away from the flange portion; and
- a convex washer.

7. The rotating suspension point assembly of claim 6, wherein the tubular structure projects perpendicularly from the plate.

8. The rotating suspension point assembly of claim 6, wherein the main portion of the concave bushing has a first outer diameter and the flange portion has a second outer diameter, wherein the first outer diameter is less than the second outer diameter.

9. The rotating suspension point assembly of claim 8, wherein the tubular structure of the base has a first internal diameter and a second internal diameter, with the first internal diameter being less than the second internal diameter, and the first and second internal diameters of the tubular structure correspond with the first and second outer diameters of the concave bushing.

10. The rotating suspension point assembly of claim 6, wherein the surface of the flange portion of the concave bushing is concave.

11. The rotating suspension point assembly of claim 10, wherein the concave surface of the flange portion of the concave bushing and the convex washer are positioned so as to form a spherical washer.

12. The rotating suspension point assembly of claim 6, wherein the convex washer has an elongated central opening.

13. The rotating suspension point assembly of claim 12, where each of the base and concave bushing have a central opening coaxial with each other and the elongated central opening of the convex washer.

14. The rotating suspension point assembly of claim 6, further comprising a bearing plate having a surface area greater than that of the plate of the base.

* * * * *